US012665131B2

(12) United States Patent
Lim et al.

(10) Patent No.: US 12,665,131 B2
(45) Date of Patent: Jun. 23, 2026

(54) CERAMIC CAPACITOR

(71) Applicant: AMOTECH CO., LTD., Incheon (KR)

(72) Inventors: Byungguk Lim, Incheon (KR); Yunsuk Choi, Incheon (KR); Jaeyong Song, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 137 days.

(21) Appl. No.: 18/725,762

(22) PCT Filed: Dec. 2, 2022

(86) PCT No.: PCT/KR2022/019473
§ 371 (c)(1),
(2) Date: Jun. 29, 2024

(87) PCT Pub. No.: WO2023/128344
PCT Pub. Date: Jul. 6, 2023

(65) Prior Publication Data
US 2025/0104916 A1 Mar. 27, 2025

(30) Foreign Application Priority Data
Dec. 29, 2021 (KR) ........................ 10-2021-0190630

(51) Int. Cl.
*H01G 4/012* (2006.01)
*H01G 2/06* (2006.01)
*H01G 4/12* (2006.01)
*H01G 4/232* (2006.01)
*H01G 4/30* (2006.01)

(52) U.S. Cl.
CPC ............. *H01G 4/012* (2013.01); *H01G 2/065* (2013.01); *H01G 4/12* (2013.01); *H01G 4/232* (2013.01); *H01G 4/30* (2013.01)

(58) Field of Classification Search
None
See application file for complete search history.

(56) References Cited

U.S. PATENT DOCUMENTS 6,619,763 B2 * 9/2003 Trinh ........................ H01G 4/30
361/302
7,251,119 B2 7/2007 Kim et al.
7,456,459 B2 11/2008 Wan
(Continued)

FOREIGN PATENT DOCUMENTS

JP 2002-299149 A 10/2002
JP 2004-047707 A 2/2004
(Continued)

OTHER PUBLICATIONS

KR Office Action dated May 8, 2024 as received in Application No. 10-2021-0190630.

*Primary Examiner* — Dion R. Ferguson
(74) *Attorney, Agent, or Firm* — Maschoff Brennan

(57) ABSTRACT

Provided is a ceramic capacitor capable of reducing the influence of deviation even when internal electrodes are misaligned. The disclosed ceramic capacitor comprises: a ceramic body; a first internal electrode disposed inside the ceramic body; and a second internal electrode disposed inside the ceramic body and surrounding the circumference of the first internal electrode while being spaced apart from the first internal electrode on the same horizontal plane as the first internal electrode.

16 Claims, 8 Drawing Sheets

(56) References Cited

U.S. PATENT DOCUMENTS

| | | | |
|---|---|---|---|
| 9,099,249 B2 | 8/2015 | Ahn et al. | |
| 9,524,827 B2 * | 12/2016 | Choi | H01G 4/30 |
| 9,786,437 B1 * | 10/2017 | Trinh | H01G 4/232 |
| 10,176,922 B2 | 1/2019 | Inomata et al. | |
| 10,199,172 B2 * | 2/2019 | Martinez | H01G 4/012 |
| 10,262,803 B1 * | 4/2019 | Trinh | H01G 4/005 |
| 10,741,330 B1 * | 8/2020 | Trinh | H01G 4/005 |
| 11,361,907 B2 | 6/2022 | Berolini et al. | |
| 2003/0007310 A1 * | 1/2003 | Trinh | H01G 4/35 |
| | | | 361/302 |
| 2015/0302991 A1 * | 10/2015 | Choi | H01G 4/232 |
| | | | 361/301.4 |
| 2025/0104916 A1 * | 3/2025 | Lim | H01G 4/012 |

FOREIGN PATENT DOCUMENTS

| | | | |
|---|---|---|---|
| JP | 2017-135288 A | 8/2017 | |
| KR | 10-0587006 B1 | 6/2006 | |
| KR | 10-0847211 B1 | 7/2008 | |
| KR | 10-1444540 B1 | 9/2014 | |
| KR | 10-2017-0011247 A | 2/2017 | |
| KR | 10-2021-0098546 A | 8/2021 | |

* cited by examiner

CERAMIC CAPACITOR

TECHNICAL FIELD

The present disclosure relates to a ceramic capacitor, and more particularly, to a ceramic capacitor capable of adjusting a current so that the current can constantly flow into a circuit and preventing an electromagnetic interference phenomenon between parts.

BACKGROUND ART

A capacitor is used to protect a corresponding part by storing electricity when there is a part for which a voltage needs to be constantly maintained and uniformly and stably supplying electricity required by the part, used to remove noise within an electronic device, or used to transmit only an AC signal in a signal in which a DC and an AC are mixed.

Such a capacitor may be basically divided into a ceramic capacitor, an aluminum capacitor, a tantalum capacitor, a film capacitor, etc.

Among them, in general, the ceramic capacitor consists of a dielectric, an internal electrode, and an external electrode. Miniaturization and a higher capacity for the ceramic capacitor are implemented by stacking many layers of internal electrodes in a limited space because electric charges are accumulated between the internal electrodes that face each other.

The contents described in the Background Art are to help the understanding of the background of the disclosure, and may include contents that are not a disclosed conventional technology.

DISCLOSURE

Technical Problem

The present disclosure has been proposed by considering the conventional situation, and an object of the present disclosure is to provide a ceramic capacitor capable of reducing the influence of a deviation although the alignment of internal electrodes is askew.

Technical Solution

In order to achieve the object, a ceramic capacitor according to a preferred embodiment of the present disclosure includes a ceramic body, a first internal electrode disposed within the ceramic body, and a second internal electrode disposed within the ceramic body, spaced apart from the first internal electrode on a horizontal plane identical with a horizontal plane of the first internal electrode and configured to surround the circumference of the first internal electrode.

A preferred embodiment of the present disclosure may further include a via formed in the first internal electrode.

The via may connect the first internal electrode to an external electrode of a first cross section, among both cross sections of the ceramic body.

The second internal electrode may have one end exposed to a second cross section, among both cross sections of the ceramic body.

One end of the second internal electrode may be connected to an external electrode of the second cross section.

A preferred embodiment of the present disclosure may further include a tab electrode disposed within the ceramic body, spaced apart from the second internal electrode, and disposed on a horizontal plane identical with the horizontal planes of the first internal electrode and the second internal electrode.

The tab electrode may have one end exposed to a first cross section, among both cross sections of the ceramic body.

One end of the tab electrode may be connected to an external electrode of the first cross section.

The first internal electrode may have an angular shape.

A preferred embodiment of the present disclosure may further include a third internal electrode disposed within the ceramic body and disposed on a horizontal plane different from horizontal planes of the first internal electrode and the second internal electrode.

A via formed in the first internal electrode may be connected to the third internal electrode.

The third internal electrode may have one end exposed to a first cross section, among both cross sections of the ceramic body.

One end of the third internal electrode may be connected to an external electrode of the first cross section.

The third internal electrode may include an extension part and form a form of an alphabetic letter T.

The extension part may have a length up to a location over or under a location at which the first internal electrode has been formed.

The extension part may extend up to a location over or under a location on one side of the first internal electrode after passing a location at which the via has been formed.

The extension part may have a width that is greater than the diameter of the via and that is smaller than the width of the first internal electrode.

A preferred embodiment of the present disclosure may further include a dummy electrode disposed within the ceramic body, spaced apart from the third internal electrode, and disposed on a horizontal plane identical with the horizontal plane of the third internal electrode.

The dummy electrode may have one end exposed to a second cross section, among both cross sections of the ceramic body.

One end of the dummy electrode may be connected to an external electrode of the second cross section.

A preferred embodiment of the present disclosure may further include a first via formed in the first internal electrode and a second via formed in the second internal electrode.

The first via may connect the first internal electrode to a first bottom electrode on a lower surface of the ceramic body.

The second via may connect the first internal electrode to a second bottom electrode on the lower surface of the ceramic body.

Advantageous Effects

According to the present disclosure having such a construction, the influence of a deviation can be reduced although the alignment of internal electrodes is slightly askew in a mass-production process because the first internal electrode and the second internal electrode are formed on the same horizontal plane within the ceramic body, but the second internal electrode is formed to surround the circumference of the first internal electrode.

That is, there is no change in a capacitance value although a slight deviation occurs because a problem occurs in the alignment of the first internal electrode and/or the second internal electrodes.

MODE FOR INVENTION

Figure 1:
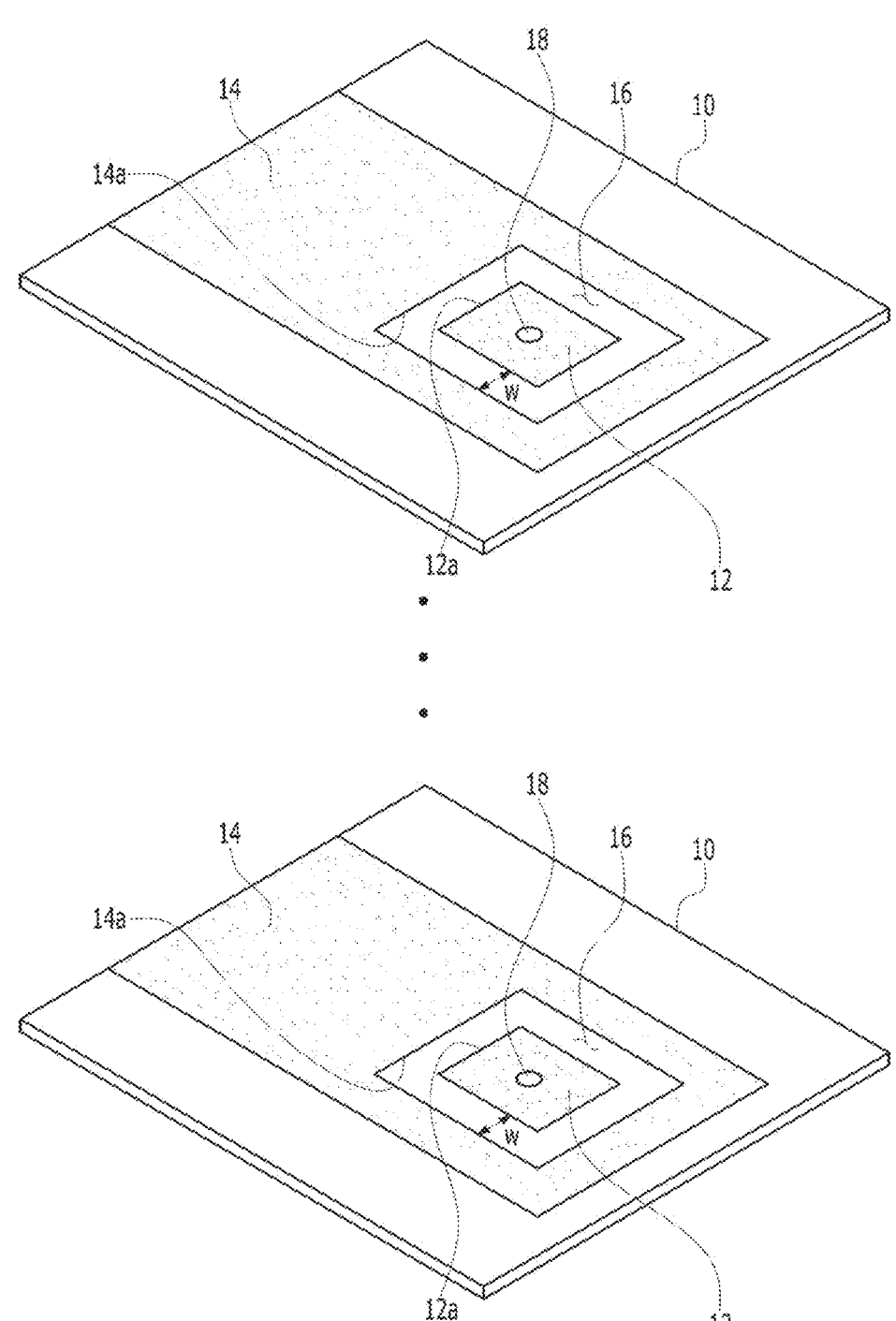
FIG. 1 is an exploded perspective view of a ceramic capacitor according to a first embodiment of the present disclosure.

The present disclosure may be changed in various ways and may have various embodiments. Specific embodiments are to be illustrated in the drawings and specifically described.

It should be understood that the present disclosure is not intended to be limited to the specific embodiments, but includes all of changes, equivalents and/or substitutions included in the spirit and technical range of the present disclosure.

Terms used in the present application are used to merely describe specific embodiments and are not intended to restrict the present disclosure. An expression of the singular number includes an expression of the plural number unless clearly defined otherwise in the context. In the present application, it is to be understood that a term, such as "include" or "have", is intended to designate that a characteristic, a number, a step, an operation, a component, a part or a combination of them described in the specification is present, and does not exclude the presence or addition possibility of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification. Terms, such as those defined in commonly used dictionaries, should be construed as having the same meanings as those in the context of a related technology, and are not construed as ideal or excessively formal meanings unless explicitly defined otherwise in the specification.

Hereinafter, preferred embodiments of the present disclosure are more specifically described with reference to the accompanying drawings. In describing the present disclosure, in order to help general understanding, the same reference numerals are used to denote the same components throughout the drawings, and a redundant description of the same components is omitted.

In the specification of the present disclosure, a ceramic capacitor is a multi-layer ceramic capacitor (MLCC), for example.

Figure 2:
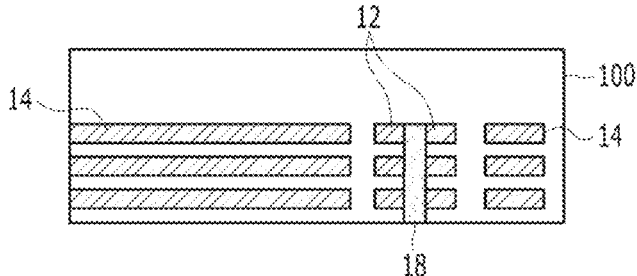
FIG. 2 is a longitudinal cross-sectional view of the ceramic capacitor according to the first embodiment of the present disclosure.
Figure 3:
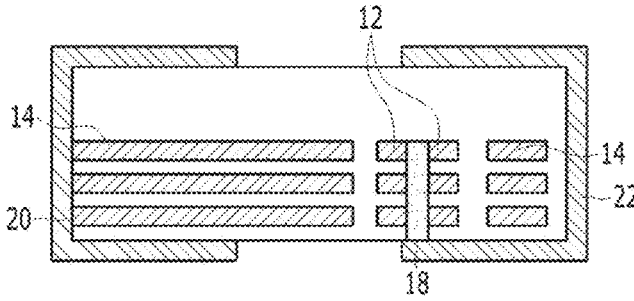
FIG. 3 is a longitudinal cross-sectional view in a case in which external electrodes have been formed in the ceramic capacitor according to the first embodiment of the present disclosure.
Figure 4:
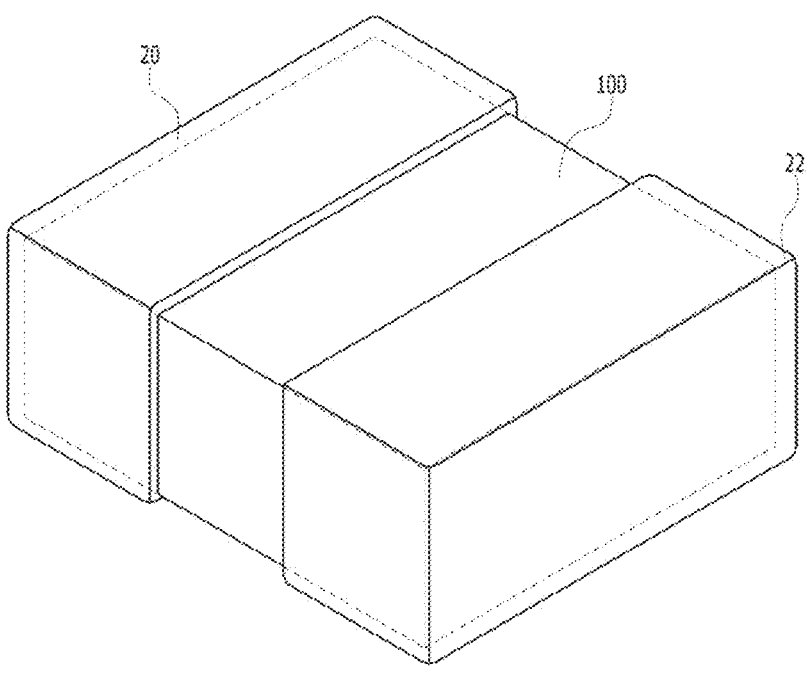
FIG. 4 is an external perspective view of the ceramic capacitor according to the first embodiment of the present disclosure.

FIG. 1 is an exploded perspective view of a ceramic capacitor according to a first embodiment of the present disclosure. FIG. 2 is a longitudinal cross-sectional view of the ceramic capacitor according to the first embodiment of the present disclosure. FIG. 3 is a longitudinal cross-sectional view in a case in which external electrodes have been formed in the ceramic capacitor according to the first embodiment of the present disclosure. FIG. 4 is an external perspective view of the ceramic capacitor according to the first embodiment of the present disclosure. In FIGS. 1 to 4, the thickness of a dielectric layer, an internal electrode, etc. has merely been exaggerated in order to help understanding of a description, and does not need to be essentially a corresponding thickness.

External electrodes have been applied to both cross sections of the ceramic capacitor according to the first embodiment of the present disclosure.

The ceramic capacitor according to the first embodiment of the present disclosure includes one or more dielectric layers 10.

The dielectric layer 10 may include a ceramic material having a high dielectric constant. For example, a material that forms the dielectric layer 10 may include a barium titanate ($BaTiO_3$)-based or strontium titanate ($SrTiO_3$)-based substance, but another substance that is known in the art may also be used if sufficient capacitance can be obtained by another substance. The dielectric layer 10 may further include additives, an organic solvent, a plasticizer, a binder, a dispersant, etc., in addition to such a ceramic material, that is, a major component. Among them, as additives, the dielectric layer may include the same substance as that added to internal electrodes 12 and 14. A concentration of such additives needs to be locally properly adjusted in order to secure a uniform sintering characteristic.

A first internal electrode 12 and a second internal electrode 14 may be formed in the dielectric layer 10. That is, the first internal electrode 12 and the second internal electrode 14 may be formed on the same plane (e.g., an upper surface) of the dielectric layer 10. As a result, the first internal electrode 12 and the second internal electrode 14 may be said to be formed (or disposed) on the same horizontal plane.

For example, the first internal electrode 12 may be formed in a quadrangle. In FIG. 1, a form of the first internal electrode 12 has been illustrated as being a rectangle, but a form of the first internal electrode 12 may be a form, such as a square, a lozenge, a parallelogram, an isosceles trapezoid, or a trapezoid and may be another form in addition to such forms. Accordingly, a form of the first internal electrode 12 may be said to form an angular shape (i.e., an angled form). In this case, a circle is excluded from the angular shape.

The second internal electrode 14 may be formed to surround the circumference of the first internal electrode 12, but to be spaced apart from the first internal electrode 12 at a designated interval w through the medium of a separation space 16.

In this case, it is preferred that the interval w between a side 12a (e.g., four sides) of the first internal electrode 12 and a side 14a (e.g., four sides) of the second internal electrode 14 that is opposite to the side of the first internal electrode is uniform. That is, in FIG. 1, there are four places each of which includes two sides that face each other between the first internal electrode 12 and the second internal electrode 14. It is better that the intervals w in the four places, respectively, are uniform.

Furthermore, an end of the second internal electrode 14 on one side thereof is formed to be disposed on the same line as an end of a corresponding dielectric layer 10 on one side thereof. Accordingly, one side of the second internal electrode 14 in the ceramic body 100 is exposed to the outside (refer to FIG. 2).

The first internal electrode 12 and the second internal electrode 14 may be formed of one of Cu, Ni, and Pd—Ag or an alloy of them. In order to suppress the oxidation of an internal electrode during a plasticizing process that is performed at a high temperature, Pd, that is, expensive precious metal, may be used as the internal electrodes 12 and 14. However, in order to reduce a cost incurred according to requirements for miniaturization and higher capacity of an MLCC, Ag—Pd, Ni, Cu, etc. may be used as the internal electrodes 12 and 14.

Meanwhile, a via 18 is formed in the dielectric layer 10 for interlayer conduction. Preferably, the via 18 is formed to penetrate a corresponding dielectric layer 10. Accordingly, the first internal electrodes 12 formed in the dielectric layers 10 may be electrically connected through the vias 18, respectively. That is, the first internal electrode 12 formed in any one dielectric layer 10 may be electrically connected to the first internal electrode 12 of another dielectric layer 10 over or under the any one dielectric layer through the via 18.

For example, the inside of the via 18 may be plated with one of Cu, Ni, and Pd—Ag or an alloy of them. Alternatively, the inside of the via 18 may be filled with a conductive material.

External electrodes 20 and 22 are disposed in both cross sections of a ceramic body 100, respectively, as in FIGS. 3 and 4. The external electrodes 20 and 22 are connected to a board (not illustrated). The external electrodes 20 and 22 may be formed on both cross sections of the ceramic body 100 by plating an external electrode material.

For example, the external electrodes 20 and 22 may each be formed to have a three-layer structure of Cu—Ag epoxy-Ni. Sn may be used instead of Ni, if necessary. The Ag epoxy may be said to be for stress absorption for preventing a crack.

The multiple dielectric layers 10 are plasticized after being stacked in the state in which the multiple dielectric layers maintain horizontality. Accordingly, the ceramic body 100 is completed. The ceramic body 100 is also called a ceramic element. In the ceramic body 100, the multiple dielectric layers 10 are in the state in which the multiple dielectric layers have been sintered, and boundaries between adjacent dielectric layers 10 may be integrated to the extent that it is difficult to check the boundary.

The ceramic body 100 may be formed in an approximately rectangular parallelepiped shape, and includes front and rear surfaces that face each other, upper and lower surfaces that face each other, and both cross sections that face each other. A lower surface of the ceramic body 100 may be said to be a mounting surface that is mounted on the board. A surface that faces the lower surface may be said to be an upper surface. Two surfaces that are orthogonal to the upper and lower surfaces and that each have a long length may be said to be a front surface and a rear surface. Two surfaces that are orthogonal to the upper and lower surfaces and that each have a short length may be said to be both cross sections.

An end of the second internal electrode 14 on one side thereof within the ceramic body 100 is exposed to any one cross section, among both cross sections of a corresponding ceramic body 100 (refer to FIG. 2).

Any one external electrode (e.g., 22), among the external electrodes 20 and 22 of both cross sections of the ceramic body 100 on the outside thereof, is electrically connected to all of the first internal electrodes 12 through the via 18.

FIG. 1 illustrates only the dielectric layer 10 in which the first internal electrode 12, the second internal electrode 14, and the via 18 have been formed, but may illustrate that a dielectric layer in which the internal electrodes 12 and 14 and the via 18 have not been formed is additionally stacked over or under the dielectric layer 10, if necessary.

FIGS. 2 and 3 illustrate a case in which three dielectric layers 10 have been stacked, but the number of dielectric layers 10 may be increased, if necessary.

Meanwhile, in FIGS. 2 and 3, a portion in which the three dielectric layers 10 have been stacked may be said to be a capacitance layer. In FIGS. 2 and 3, such a capacitance layer has been disposed in a lower part within the ceramic body 100, but the capacitance layer may be disposed in an upper part or a central part within the ceramic body 100.

In the ceramic capacitor of the first embodiment of the present disclosure, when a voltage is applied to the external electrodes 20 and 22, electric charges are accumulated at a space (i.e., the separation part 16) between the first internal electrode 12 and the second internal electrode 14. For example, the separation part 16 may be defined as a space between the sides 12a of the first internal electrode 12 and sides 14a of the second internal electrode 14. In this case, capacitance may be determined as the quantity of charges that are accumulated between the side 12a of the first internal electrode 12 and the side 14a of the second internal electrode 14, which faces the side of the first internal electrode.

An example of a common ceramic capacitor may include a ceramic capacitor in which a first internal electrode and a second internal electrode have been alternately stacked. In such a ceramic capacitor, it is most preferred that the area in which the first internal electrode and the second internal electrode that are disposed up and down overlap is accurate. If any one of internal electrodes slightly falls outside from its right position because a problem occurs in alignment a capacitance value to be obtained is not properly obtained because the area in which the internal electrodes overlap is different. In contrast, in the ceramic capacitor of the first embodiment of the present disclosure, although the first internal electrode 12 and/or the second internal electrode 14 has been shifted in one direction, capacitance is not generated in up and down directions because the same electrodes are disposed in the up and down directions, but capacitance is generated between the sides of the four places that face each other. In other words, in the ceramic capacitor of the first embodiment of the present disclosure, an interval between the first internal electrode 12 and the second internal electrode 14 is maintained although the internal electrodes 12 and 14 generally slightly fall outside because the internal electrodes 12 and 14 are formed (or disposed) on the same horizontal plane. Accordingly, it is more advantageous in a deviation problem because there is almost no change in a capacitance value. The internal electrodes 12 and 14 formed in the dielectric layer 10 may excessively fall outside from their right positions, and may slightly overlap the first internal electrode 12 and second internal electrode 14 of another dielectric layer 10 that is disposed over or under the corresponding dielectric layer 10. Such a case should be left aside because the dielectric layer will be filtered in a process of manufacturing a ceramic capacitor.

Another example of a common ceramic capacitor may include a ceramic capacitor in which a first internal electrode and a second internal electrode are formed (or disposed) on the same horizontal plane, but one end of the first internal electrode is formed to face one end of the second internal electrode. Sides of such a ceramic capacitor face each other at one place. Capacitance will be generated between the sides at the one place. In contrast, in the ceramic capacitor of the first embodiment of the present disclosure, capacitance is generated between the sides of the four places that face each other. Accordingly, in the ceramic capacitor of the first embodiment of the present disclosure, a greater capacitance value can be formed, and the design (or adjustment) of a capacitance value is also easier by adjusting the lengths of two sides that face each other, an interval between the two sides, etc.

As described above, in the ceramic capacitor of the first embodiment of the present disclosure, there is no change in a capacitance value although a slight deviation occurs because there is a problem with the alignment of the first internal electrode 12 and/or the second internal electrode 14.

Figure 5:
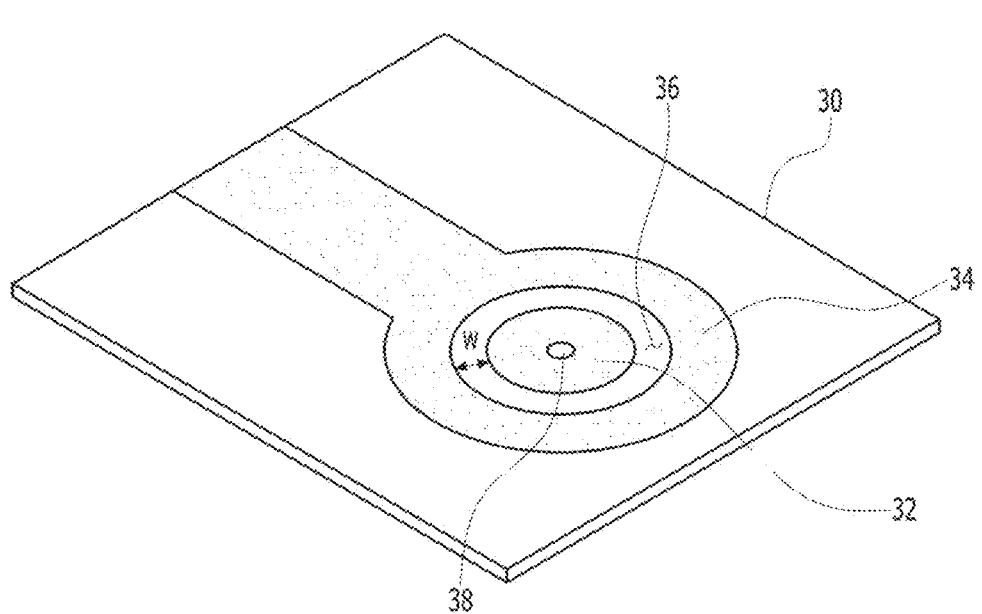
FIG. 5 is a diagram illustrating a modified example of the first embodiment of the present disclosure.

FIG. 5 is a diagram illustrating a modified example of the first embodiment of the present disclosure.

The modified example of FIG. 5 is the same as the first embodiment of the present disclosure except forms of internal electrodes.

That is, according to the modified example of FIG. 5, a first internal electrode 32 of a dielectric layer 30 is formed in a circle, and a via 38 is formed at a central part of the first internal electrode. A second internal electrode 34 of the dielectric layer 30 is formed to surround the circumference of the first internal electrode 32, but to be spaced apart from the first internal electrode 32 at a designated interval w through the medium of a separation space 36. Furthermore, an end of the second internal electrode 34 on one side thereof is formed to be disposed on the same line as an end of the corresponding dielectric layer 30 on one side thereof.

As described above, in the modified example of FIG. 5, only the forms of the internal electrodes 32 and 34 are different, and effects by the structure of the first embodiment of the present disclosure can be obtained without any change.

Figure 6:
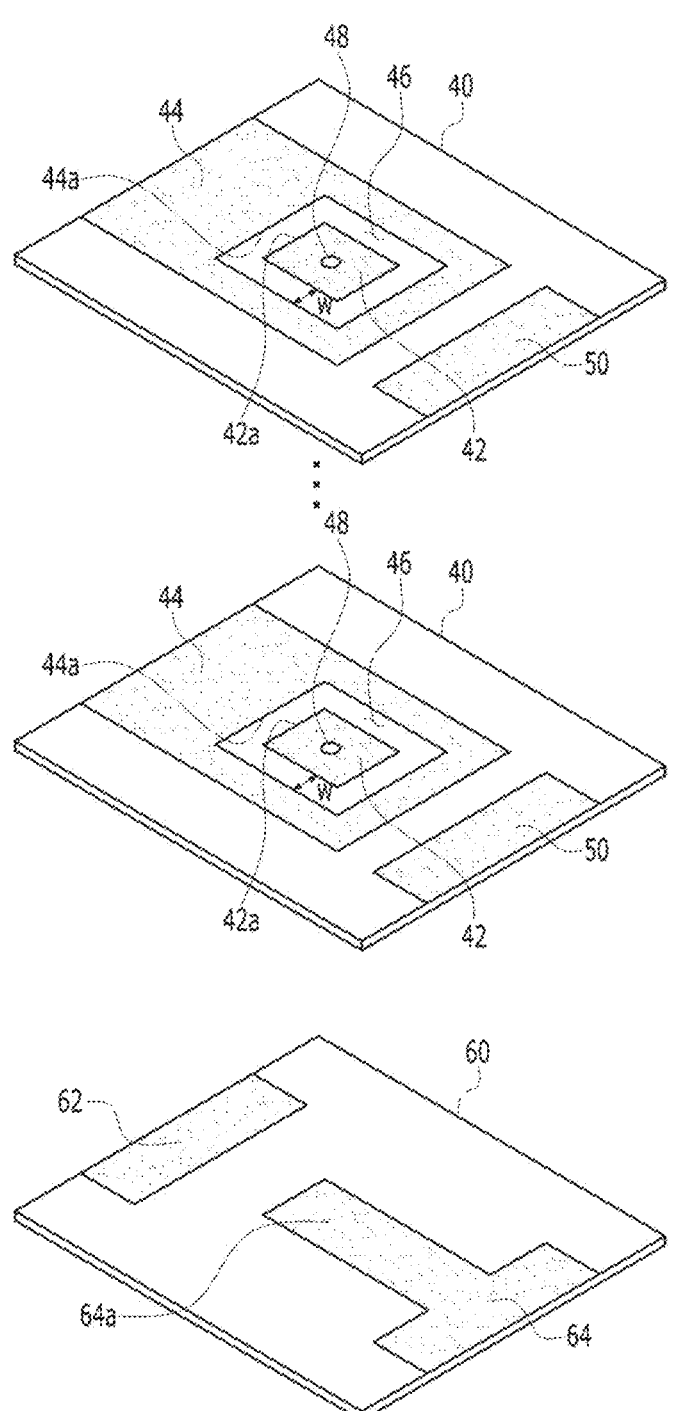
FIG. 6 is an exploded perspective view of a ceramic capacitor according to a second embodiment of the present disclosure.
Figure 7:
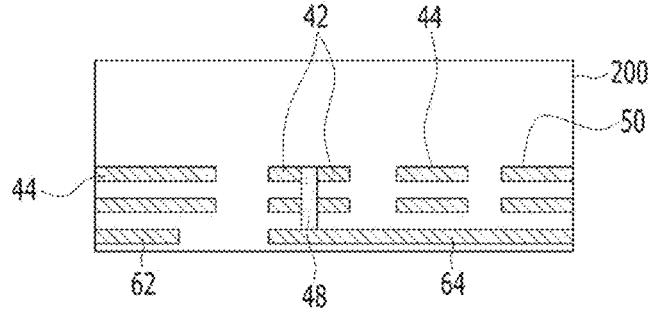
FIG. 7 is a longitudinal cross-sectional view of the ceramic capacitor according to the second embodiment of the present disclosure.
Figure 8:
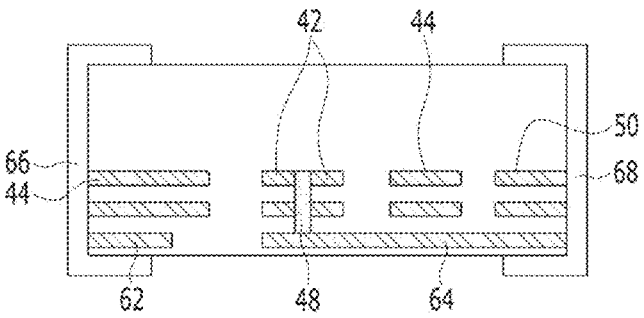
FIG. 8 is a longitudinal cross-sectional view in a case in which external electrodes have been formed in the ceramic capacitor according to the second embodiment of the present disclosure.
Figure 9:
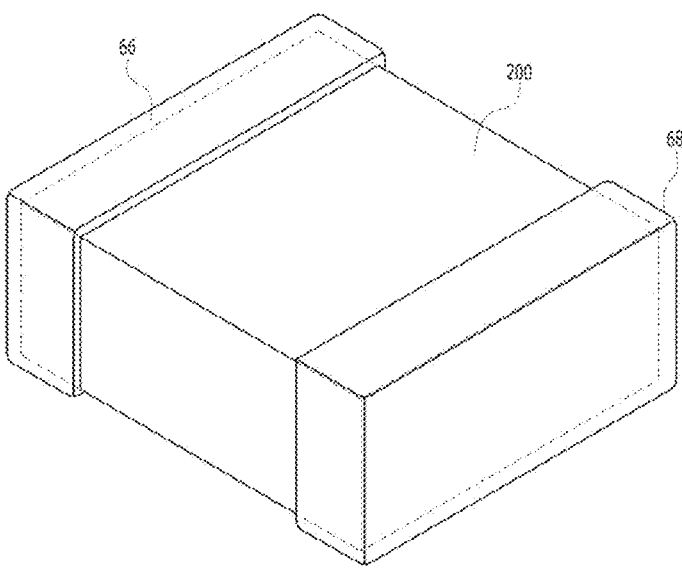
FIG. 9 is an external perspective view of the ceramic capacitor according to the second embodiment of the present disclosure.

FIG. 6 is an exploded perspective view of a ceramic capacitor according to a second embodiment of the present disclosure. FIG. 7 is a longitudinal cross-sectional view of the ceramic capacitor according to the second embodiment of the present disclosure. FIG. 8 is a longitudinal cross-sectional view in a case in which external electrodes have been formed in the ceramic capacitor according to the second embodiment of the present disclosure. FIG. 9 is an external perspective view of the ceramic capacitor according to the second embodiment of the present disclosure. In FIGS. 6 to 9, the thickness of a dielectric layer, an internal electrode, etc. has merely been exaggerated in order to help understanding of a description, and does not need to be essentially a corresponding thickness.

External electrodes have been applied to both cross sections of the ceramic capacitor according to the second embodiment of the present disclosure.

The ceramic capacitor according to the second embodiment of the present disclosure includes one or more first dielectric layers 40 and a second dielectric layer 60.

The dielectric layer 40, 60 may include a ceramic material having a high dielectric constant. For example, a material that forms the dielectric layer 40, 60 may include a barium titanate ($BaTiO_3$)-based or strontium titanate ($SrTiO_3$)-based substance, but another substance that is known in the art may also be used if sufficient capacitance can be obtained by another substance. The dielectric layer 40, 60 may further include additives, an organic solvent, a plasticizer, a binder, a dispersant, etc., in addition to such a ceramic material, that is, a major component. Among them, as additives, the dielectric layer may include the same substance as that added to internal electrodes. A concentration of such additives needs to be locally properly adjusted in order to secure a uniform sintering characteristic.

A first internal electrode 42 and a second internal electrode 44 may be formed in a first dielectric layer 40. That is, the first internal electrode 42 and the second internal electrode 44 may be formed on the same plane (e.g., an upper surface) of the first dielectric layer 40. As a result, the first internal electrode 42 and the second internal electrode 44 may be said to be formed (or disposed) on the same horizontal plane.

For example, the first internal electrode 42 may be formed in a quadrangle. In FIG. 6, a form of the first internal electrode 42 has been illustrated as being a rectangle, but a form of the first internal electrode 42 may be a form, such as a square, a lozenge, a parallelogram, an isosceles trapezoid, or a trapezoid and may be another form in addition to such forms. Accordingly, a form of the first internal electrode 42 may be said to form an angular shape (i.e., an angled form). In this case, a circle is excluded from the angular shape.

The second internal electrode 44 may be formed to surround the circumference of the first internal electrode 42, but to be spaced apart from the first internal electrode 42 at a designated interval w through the medium of a separation space 46.

In this case, it is preferred that the interval w between a side 42a (e.g., four sides) of the first internal electrode 42 and a side 44a (e.g., four sides) of the second internal electrode 44 that is opposite to the side of the first internal electrode is uniform. That is, in FIG. 6, there are four places each of which includes two sides that face each other between the first internal electrode 42 and the second internal electrode 44. It is better that the intervals w in the four places, respectively, are uniform.

Furthermore, an end of the second internal electrode 44 on one side thereof is formed to be disposed on the same line as an end of the corresponding dielectric layer 40 on one side thereof. Accordingly, one side of the second internal electrode 44 is exposed to the outside in a ceramic body 200 (refer to FIG. 7).

The first internal electrode 42 and the second internal electrode 44 may be formed of one of Cu, Ni, and Pd—Ag or an alloy of them. In order to suppress the oxidation of an internal electrode during a plasticizing process that is performed at a high temperature, Pd, that is, expensive precious metal, may be used as the internal electrodes. However, in order to reduce a cost incurred according to requirements for miniaturization and higher capacity of an MLCC, Ag—Pd, Ni, Cu, etc. may be used as the internal electrodes.

Meanwhile, a via 48 is formed in the first dielectric layer 40 for interlayer conduction. Preferably, the via 48 is formed to penetrate the corresponding dielectric layer 40. Accordingly, the first internal electrodes 42 formed in the dielectric layers 40 may be electrically connected through the vias 48, respectively. That is, the first internal electrode 42 formed in any one first dielectric layer 40 may be electrically connected to the first internal electrode 42 of another first dielectric layer 40 over or under the any one first dielectric layer through the via 48.

For example, the inside of the via 48 may be plated with one of Cu, Ni, and Pd—Ag or an alloy of them. Alternatively, the inside of the via 48 may be filled with a conductive material.

Furthermore, a tab electrode 50 may be formed in the first dielectric layer 40. For example, the tab electrode 50 is formed together on the same plane in which the first internal electrode 42 and the second internal electrode 44 have been formed, but is formed to be spaced apart from the second internal electrode 44 that surrounds the circumference of the first internal electrode 42. In this case, an end of the tab electrode 50 on one side thereof is formed to be disposed on the same line as an end of the corresponding dielectric layer 40 on the other side thereof. As a result, the first internal electrode 42, the second internal electrode 44, and the tab electrode 50 may be said to be formed (or disposed) on the same horizontal plane. Accordingly, one side of the tab electrode 50 is exposed to the outside in the ceramic body 200 (refer to FIG. 7).

The tab electrode 50 may not be formed if necessary, but if the tab electrode 50 is additionally formed, additional capacitance can be generated and the ceramic body 200 and an external electrode 68 can be more effectively combined.

The tab electrode 50 may be formed of one of Cu, Ni, and Pd—Ag or an alloy of them. In order to suppress the oxidation of an internal electrode during a plasticizing process that is performed at a high temperature, Pd, that is, expensive precious metal, may be used as the tab electrode 50. However, in order to reduce a cost incurred according to requirements for miniaturization and higher capacity of an MLCC, Ag—Pd, Ni, Cu, etc. may be used as the tab electrode 50.

The tab electrode 50 may also be applied to the first embodiment of the present disclosure. Although this has not been presented through a separate drawing, it is considered that those skilled in the art may sufficiently understand such application through FIG. 6.

The second dielectric layer 60 may be disposed over the first dielectric layer 40 or disposed under the first dielectric layer 40.

A dummy electrode 62 and a third internal electrode 64 that is directly connected to one end of the via 48 are formed in the second dielectric layer 60. In this case, the connection may mean a close attachment or contact.

The dummy electrode 62 and the third internal electrode 64 are spaced apart from each other, but an end of the dummy electrode 62 on one side thereof may be formed to be disposed on the same line as an end of the corresponding dielectric layer 60 on one side thereof and an end of the third internal electrode 64 on one side thereof may be formed to be disposed on the same line as an end of the corresponding dielectric layer 60 on the other side thereof. As a result, the dummy electrode 62 and the third internal electrode 64 may be considered as being formed (or disposed) on the same horizontal plane. Furthermore, the dummy electrode 62 and the third internal electrode 64 may be considered as being formed (or disposed) on a horizontal plane different from that of the first internal electrode 42 and the second internal electrode 44.

Accordingly, one side of the dummy electrode 62 is exposed to the outside and one side of the third internal electrode 64 is exposed to the outside, in the ceramic body 200 (refer to FIG. 7).

The dummy electrode 62 may not be formed if necessary, but if the dummy electrode 62 is additionally formed, the ceramic body 200 and an external electrode 66 can be more effectively combined.

Meanwhile, the third internal electrode 64 may be formed in an alphabetic letter "T" shape. It is preferred that an extension part 64a of the third internal electrode 64 has a length and width to the extent that the extension part can be directly connected to the via 48.

In particular, in order to minimize the generation of unwanted capacitance between the second internal electrode 44 and the third internal electrode 64, it is better that a width w1 of the extension part 64a of the third internal electrode 64 is narrow as much as possible. For example, it is preferred that the extension part 64a has a length up to a location under or above the location at which the first internal electrode 42 has been formed (more preferably, a location under or above a location one side of a corresponding first internal electrode 42 after passing the location at which the via 48 has been formed) and the width of the extension part is greater than the diameter of the via 48, but is smaller than the width of the first internal electrode 42.

The dummy electrode 62 and the third internal electrode 64 may be formed of one of Cu, Ni, and Pd—Ag or an alloy of them. In order to suppress the oxidation of an internal electrode during a plasticizing process that is performed at a high temperature, Pd, that is, expensive precious metal, may be used as the dummy electrode 62 and the third internal electrode 64. However, in order to reduce a cost incurred according to requirements for miniaturization and higher capacity of an MLCC, Ag—Pd, Ni, Cu, etc. may be used as the dummy electrode 62 and the third internal electrode 64.

The external electrodes 66 and 68 are disposed in both cross sections of the ceramic body 200, respectively, as in FIGS. 8 and 9. The external electrodes 66 and 68 are connected to a board (not illustrated). The external electrodes 66 and 68 may be formed on the both cross sections of the ceramic body 200 by plating an external electrode material.

For example, the external electrodes 66 and 68 may each be formed to have a three-layer structure of Cu—Ag epoxy-Ni. Sn may be used instead of Ni, if necessary. The Ag epoxy may be said to be for stress absorption for preventing a crack.

The multiple first dielectric layers 40 and the multiple second dielectric layers 60 each are plasticized after being stacked in the state in which the dielectric layers maintain horizontality. Accordingly, the ceramic body 200 is completed. The ceramic body 200 is also called a ceramic element. In the ceramic body 200, the multiple dielectric layers 40, 60 are in the state in which the multiple dielectric layers have been sintered, and boundaries between adjacent dielectric layers may be integrated to the extent that it is difficult to check the boundary.

The ceramic body 200 may be formed in an approximately rectangular parallelepiped shape, and includes front and rear surfaces that face each other, upper and lower surfaces that face each other, and both cross sections that face each other. A lower surface of the ceramic body 200 may be said to be a mounting surface that is mounted on the board. A surface that faces the lower surface may be said to be an upper surface. Two surfaces that are orthogonal to the upper and lower surfaces and that each have a long length may be said to be a front surface and a rear surface. Two surfaces that are orthogonal to the upper and lower surfaces and that each have a short length may be said to be both cross sections.

An end of each of the second internal electrode 44 and the dummy electrode 62 on one side thereof within the ceramic body 200 is exposed to any one cross section, among both cross sections of a corresponding ceramic body 200. An end of each of the tab electrode 50 and the third internal electrode 64 on one side thereof is exposed to another cross section of the corresponding ceramic body 200 (refer to FIG. 7).

Any one external electrode (e.g., 68), among the external electrodes 66 and 68 of both cross sections of the outside of the ceramic body 200, is electrically connected to the tab electrode 50 and the third internal electrode 64. The third internal electrode 64 is electrically connected to the first internal electrode 42 through the via 48.

A dielectric layer in which an electrode and a via have not been formed may be stacked over or under the dielectric layers 40 and 60, if necessary, in addition to the first dielectric layer 40 and the second dielectric layer 60 illustrated in FIG. 6.

FIGS. 7 and 8 illustrate a case in which two first dielectric layer 40 and one second dielectric layer 60 have been stacked, but the number of first dielectric layers 40 may be increased, if necessary.

Meanwhile, in FIGS. 7 and 8, a portion in which the two first dielectric layer 40 and the one second dielectric layer 60 have been mutually stacked may be called a capacitance layer. In FIGS. 7 and 8, such a capacitance layer has been illustrated as being disposed on a lower part within the ceramic body 200, but the capacitance layer may be disposed in an upper part or a central part within the ceramic body 200.

In the ceramic capacitor of the second embodiment of the present disclosure, when a voltage is applied to the external electrodes 66 and 68, electric charges are accumulated at a space (i.e., the separation part 46) between the first internal electrode 42 and the second internal electrode 44. For example the separation part 46 may be defined as a space between the sides 42a of the first internal electrode 42 and the sides 44a of the second internal electrode 44. Designated electric charges will also be accumulated between the second internal electrode 44 and the tab electrode 50. In this case, capacitance may be determined as the quantity of charges that are accumulated between the side 42a of the first internal electrode 42 and the side 44a of the second internal electrode 44, which faces the side of the first internal electrode, and the quantity of charges that are accumulated between the second internal electrode 44 and the tab electrode 50.

An example of a common ceramic capacitor may include a ceramic capacitor in which a first internal electrode and a second internal electrode have been alternately stacked. In such a ceramic capacitor, it is most preferred that the area in which the first internal electrode and the second internal electrode that are disposed up and down overlap is accurate. If any one of internal electrodes slightly falls outside from its right position because a problem occurs in alignment a capacitance value to be obtained is not properly obtained because the area in which the internal electrodes overlap is different. In contrast, in the ceramic capacitor of the second embodiment of the present disclosure, although the first internal electrode 42 and/or the second internal electrode 44 has been shifted in one direction, capacitance is not generated in up and down directions because the same electrodes are disposed in the up and down directions, but capacitance is generated between the sides of the four places that face each other. In other words, in the ceramic capacitor of the second embodiment of the present disclosure, an interval between the first internal electrode 42 and the second internal electrode 44 is maintained although the internal electrodes 42 and 44 generally slightly fall outside because the internal electrodes 42 and 44 are formed (or disposed) on the same horizontal plane. Accordingly, it is more advantageous in a deviation problem because there is almost no change in a capacitance value. The internal electrodes 42 and 44 formed on the same plane of the dielectric layer 40 may excessively fall outside from their right positions, and may slightly overlap the first internal electrode 42 and second internal electrode 44 of another dielectric layer 40 that is disposed over or under the corresponding dielectric layer 40. Such a case should be left aside because the dielectric layer will be filtered in a process of manufacturing a ceramic capacitor.

Meanwhile, another example of a common ceramic capacitor may include a ceramic capacitor in which a first internal electrode and a second internal electrode are formed (or disposed) on the same horizontal plane, but the first internal electrode and the second internal electrode are formed so that one end of the first internal electrode and one end of the second internal electrode face each other. Sides of such a ceramic capacitor face each other at one place. Capacitance will be generated between the sides at the one place. In contrast, in the ceramic capacitor of the second embodiment of the present disclosure, capacitance is generated between the sides of the four places that face each other and between the second internal electrode and the tab electrode. Accordingly, in the ceramic capacitor of the second embodiment of the present disclosure, a greater capacitance value can be formed, and the design (or adjustment) of a capacitance value is also easier by adjusting the lengths of two sides that face each other, an interval between the two sides, etc.

As described above, in the ceramic capacitor of the second embodiment of the present disclosure, there is no change in a capacitance value although a slight deviation occurs because there is a problem with the alignment of the first internal electrode 42 and/or the second internal electrode 44.

Figure 10:
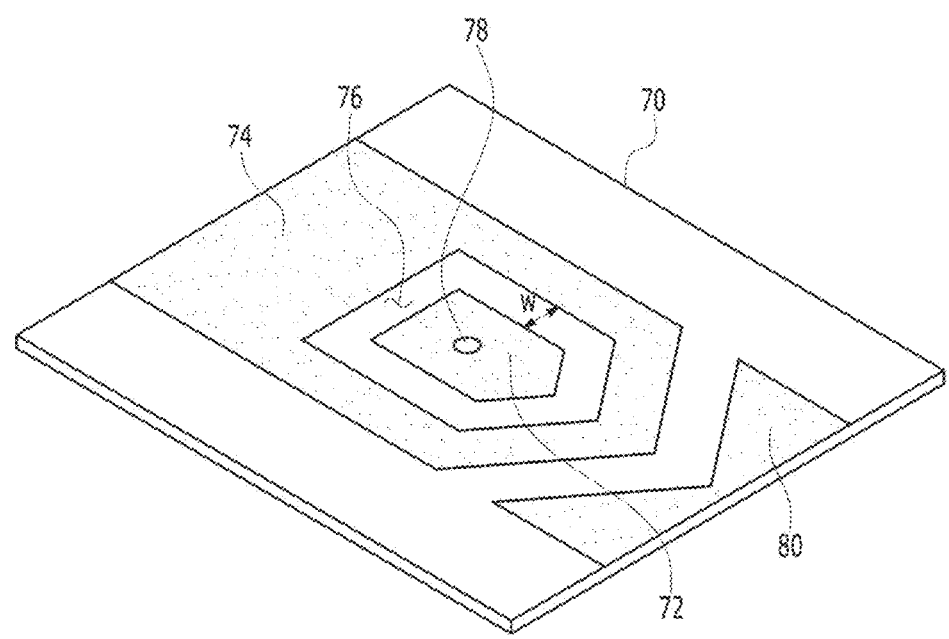
FIG. 10 is a diagram illustrating a modified example of the second embodiment of the present disclosure.

FIG. 10 is a diagram illustrating a modified example of the second embodiment of the present disclosure.

The modified example of FIG. 10 is the same as the second embodiment of the present disclosure except forms of internal electrodes.

That is, according to the modified example of FIG. 10, a first internal electrode 72 of a dielectric layer 70 is formed in a pentagon, and a via 78 is formed at a central part of the first internal electrode. A second internal electrode 74 of the dielectric layer 70 is formed to surround the circumference of the first internal electrode 72, but to be spaced apart from the first internal electrode 72 at a designated interval w through the medium of a separation space 76. Furthermore, an end of the second internal electrode 74 on one side thereof is formed to be disposed on the same line as an end of the corresponding dielectric layer 70 on one side thereof.

In FIG. 10, a form of a tab electrode 80 is slightly different from the form of the tab electrode 50 of the second embodiment of the present disclosure. The tab electrode 80 may not be present, if necessary.

As described above, in the modified example of FIG. 10, only the forms of the internal electrodes 72 and 74 are different, and effects by the structure of the second embodiment of the present disclosure can be obtained without any change.

Figure 11:
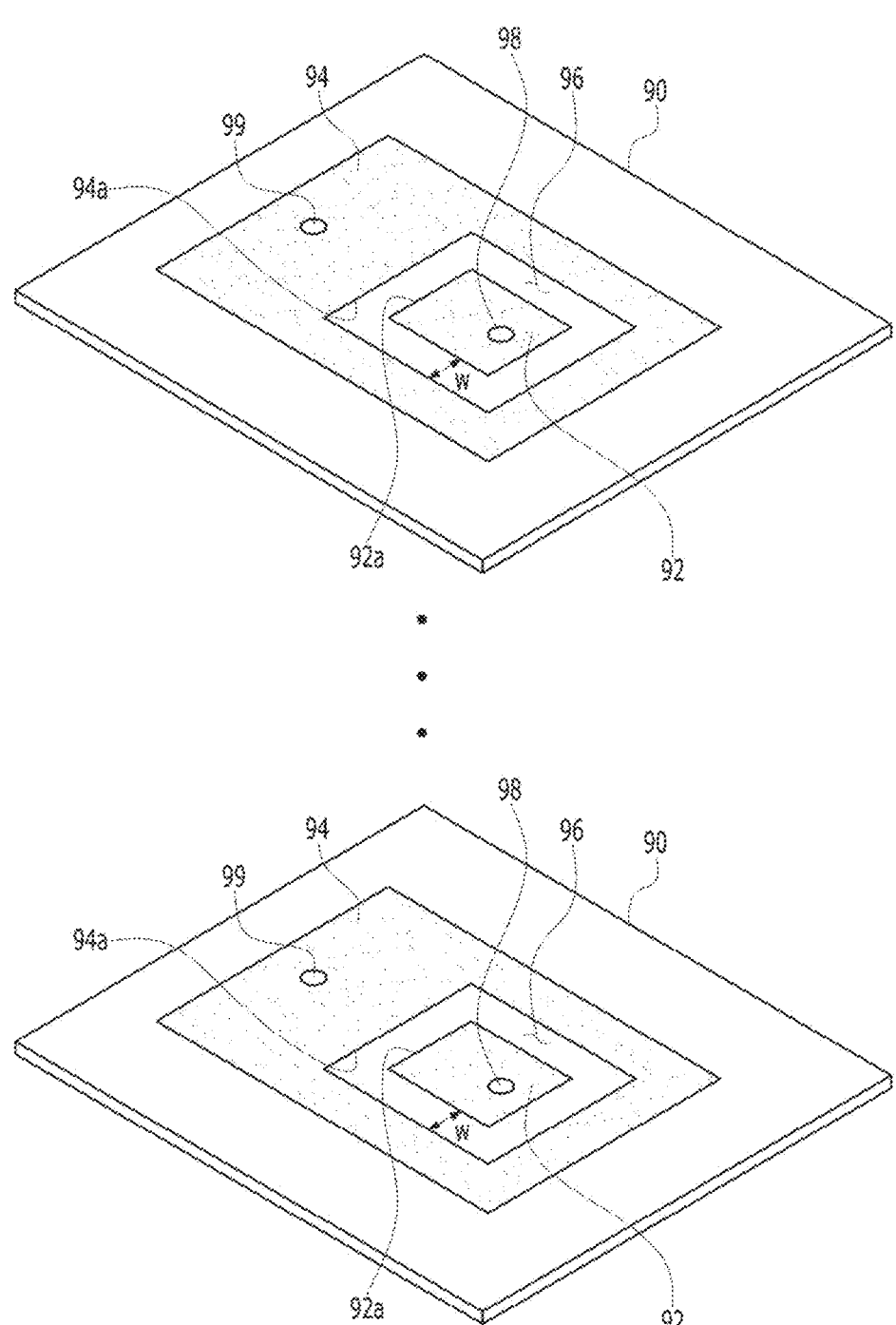
FIG. 11 is an exploded perspective view of a ceramic capacitor according to a third embodiment of the present disclosure.
Figure 12:
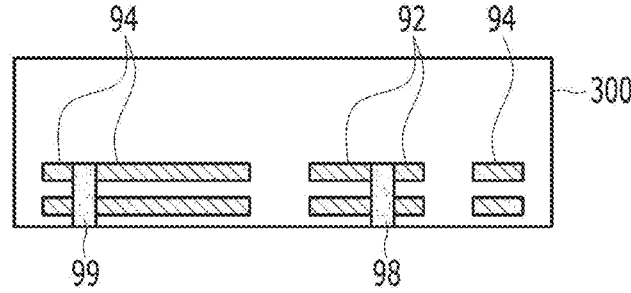
FIG. 12 is a longitudinal cross-sectional view of the ceramic capacitor according to the third embodiment of the present disclosure.
Figure 13:
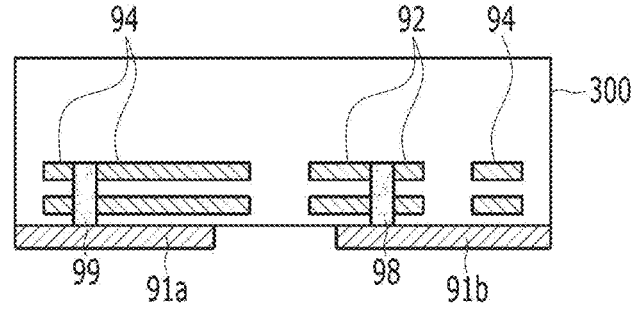
FIG. 13 is a longitudinal cross-sectional view in a case in which bottom electrodes have been formed in the ceramic capacitor according to the third embodiment of the present disclosure.

FIG. 11 is an exploded perspective view of a ceramic capacitor according to a third embodiment of the present disclosure. FIG. 12 is a longitudinal cross-sectional view of the ceramic capacitor according to the third embodiment of the present disclosure. FIG. 13 is a longitudinal cross-sectional view in a case in which bottom electrodes have been formed in the ceramic capacitor according to the third embodiment of the present disclosure. In FIGS. 11 to 13, the thickness of a dielectric layer, an internal electrode, etc. has merely been exaggerated in order to help understanding of a description, and does not need to be essentially a corresponding thickness.

Bottom electrodes have been applied to a lower surface of the ceramic capacitor according to the third embodiment of the present disclosure.

The ceramic capacitor according to the third embodiment of the present disclosure includes one or more dielectric layers 90.

The dielectric layer 90 may include a ceramic material having a high dielectric constant. For example, a material that forms the dielectric layer 90 may include a barium titanate ($BaTiO_3$)-based or strontium titanate ($SrTiO_3$)-based substance, but another substance that is known in the art may also be used if sufficient capacitance can be obtained by another substance. The dielectric layer 90 may further include additives, an organic solvent, a plasticizer, a binder, a dispersant, etc., in addition to such a ceramic material, that is, a major component. Among them, as additives, the dielectric layer may include the same substance as that added to internal electrodes 92 and 94. A concentration of such additives needs to be locally properly adjusted in order to secure a uniform sintering characteristic.

A first internal electrode 92 and a second internal electrode 94 may be formed in the dielectric layer 90. That is, the first internal electrode 92 and the second internal electrode 94 may be formed on the same plane (e.g., an upper surface) of the dielectric layer 90. As a result, the first internal electrode 92 and the second internal electrode 94 may be said to be formed (or disposed) on the same horizontal plane.

For example, the first internal electrode 92 may be formed in a quadrangle. In FIG. 11, a form of the first internal electrode 92 has been illustrated as being a rectangle, but a form of the first internal electrode 92 may be a form, such as a square, a lozenge, a parallelogram, an isosceles trapezoid, or a trapezoid and may be another form in addition to such forms. Accordingly, a form of the first internal electrode 92 may be said to form an angular shape (i.e., an angled form). In this case, a circle is excluded from the angular shape.

The second internal electrode 94 may be formed to surround the circumference of the first internal electrode 92, but to be spaced apart from the first internal electrode 92 at a designated interval w through the medium of a separation space 96.

In this case, it is preferred that an interval w between a side 92a (e.g., four sides) of the first internal electrode 92 and a side 94a (e.g., four sides) of the second internal electrode 94, which faces the side of the first internal electrode, is uniform. That is, in FIG. 11, there are four places each of which includes two sides that face each other between the first internal electrode 92 and the second internal electrode 94. It is better that the intervals w in the four places, respectively, are uniform.

The first internal electrode 92 and the second internal electrode 94 may be formed of one of Cu, Ni, and Pd—Ag or an alloy of them. In order to suppress the oxidation of an internal electrode during a plasticizing process that is performed at a high temperature, Pd, that is, expensive precious metal, may be used as the internal electrodes 92 and 94. However, in order to reduce a cost incurred according to requirements for miniaturization and higher capacity of an MLCC, Ag—Pd, Ni, Cu, etc. may be used as the internal electrodes 92 and 94.

In the third embodiment of the present disclosure, the second internal electrode 94 is not exposed to the outside of a ceramic body 300.

Meanwhile, vias 98 and 99 are formed in the dielectric layer 90 for interlayer conduction. Preferably, the vias 98 and 99 are formed to penetrate the corresponding dielectric layer 90. Accordingly, the first internal electrodes 92 formed in the dielectric layers 90 may be electrically connected through the first vias 98, respectively. The second internal electrodes 94 formed in the dielectric layers 90 may be electrically connected through the second vias 99, respectively. That is, the first internal electrode 92 formed in any one dielectric layer 90 may be electrically connected to the first internal electrode 92 of another dielectric layer 90 over or under the any one dielectric layer through the first via 98. Meanwhile, the second internal electrode 94 formed in any one dielectric layer 90 may be electrically connected to the second internal electrode 94 of another dielectric layer 90 over or under the any one dielectric layer through the second via 99.

For example, the inside of the vias 98 and 99 may be plated with one of Cu, Ni, and Pd—Ag or an alloy of them. Alternatively, the inside of the vias 98 and 99 may be filled with a conductive material.

As in FIG. 13, bottom electrodes 91a and 91b are disposed in both sides of the ceramic body 300, respectively, on a lower surface thereof. The bottom electrodes 91a and 91b are connected to a board (not illustrated). The bottom electrodes 91a and 91b may be formed in the both sides of the ceramic body 300 on the lower surface by plating an external electrode material.

For example, the bottom electrodes 91a and 91b may each be formed to have a three-layer structure of Cu—Ag epoxy-Ni. Sn may be used instead of Ni, if necessary. The Ag epoxy may be said to be for stress absorption to prevent a crack.

In this case, the bottom electrode 91b may be an example of a first bottom electrode that is described in the claims of the present disclosure. The bottom electrode 91a may be an example of a second bottom electrode that is described in the claims of the present disclosure.

The multiple dielectric layers 90 are plasticized after being stacked in the state in which the multiple dielectric layers maintain horizontality. Accordingly, the ceramic body 300 is completed. The ceramic body 300 is also called a ceramic element. In the ceramic body 300, the multiple dielectric layers 90 are in the state in which the multiple dielectric layers have been sintered, and boundaries between adjacent dielectric layers 90 may be integrated to the extent that it is difficult to check the boundary.

The ceramic body 300 may be formed in an approximately rectangular parallelepiped shape, and includes front and rear surfaces that face each other, upper and lower surfaces that face each other, and both cross sections that face each other. A lower surface of the ceramic body 300 may be said to be a mounting surface that is mounted on the board. A surface that faces the lower surface may be said to be an upper surface. Two surfaces that are orthogonal to the upper and lower surfaces and that each have a long length may be said to be a front surface and a rear surface. Two surfaces that are orthogonal to the upper and lower surfaces and that each have a short length may be said to be both cross sections.

The bottom electrode 91*b*, among the bottom electrodes 91*a* and 91*b* of the both sides of the ceramic body 300 on the lower surface, is electrically connected all of the first internal electrodes 92 through the first via 98, and the bottom electrode 91*a*, among them, is electrically connected to all of the second internal electrodes 94 through the second via 99.

FIG. 11 illustrates only the dielectric layer 90 in which the first internal electrode 92, the second internal electrode 94, and the vias 98 and 99 have been formed, but may illustrate that a dielectric layer in which the internal electrodes 92 and 94 and the vias 98 and 99 have not been formed is additionally stacked over or under the dielectric layer 90, if necessary.

FIGS. 12 and 13 illustrate a case in which two dielectric layers 90 have been stacked, but the number of dielectric layers 90 may be increased, if necessary.

Meanwhile, in FIGS. 12 and 13, a portion in which the two dielectric layers 90 have been stacked may be said to be a capacitance layer. In FIGS. 12 and 13, such a capacitance layer has been disposed in a lower part within the ceramic body 300, but the capacitance layer may be disposed in an upper part or a central part within the ceramic body 300.

In the ceramic capacitor of the third embodiment of the present disclosure, when a voltage is applied to the bottom electrodes 91*a* and 91*b*, electric charges are accumulated at a space (i.e., the separation part 96) between the first internal electrode 92 and the second internal electrode 94. For example, the separation part 96 may be defined as a space between the sides 92*a* of the first internal electrode 92 and sides 94*a* of the second internal electrode 94. In this case, capacitance may be determined as the quantity of charges that are accumulated between the side 92*a* of the first internal electrode 92 and the side 94*a* of the second internal electrode 94, which faces the side of the first internal electrode.

An example of a common ceramic capacitor may include a ceramic capacitor in which a first internal electrode and a second internal electrode have been alternately stacked. In such a ceramic capacitor, it is most preferred that the area in which the first internal electrode and the second internal electrode that are disposed up and down overlap is accurate. If any one of internal electrodes slightly falls outside from its right position because a problem occurs in alignment a capacitance value to be obtained is not properly obtained because the area in which the internal electrodes overlap is different. In contrast, in the ceramic capacitor of the third embodiment of the present disclosure, although the first internal electrode 92 and/or the second internal electrode 94 has been shifted in one direction, capacitance is not generated in up and down directions because the same electrodes are disposed in the up and down directions, but capacitance is generated between the sides of the four places that face each other. In other words, in the ceramic capacitor of the third embodiment of the present disclosure, an interval between the internal electrodes 92 and 94 is maintained although the internal electrodes 92 and 94 generally slightly fall outside because the first internal electrode 92 and the second internal electrode 94 are formed (or disposed) on the same horizontal plane. Accordingly, it is more advantageous in a deviation problem because there is almost no change in a capacitance value. The internal electrodes 92 and 94 formed in the dielectric layer 90 may excessively fall outside from their right positions, and may slightly overlap the first internal electrode 92 and second internal electrode 94 of another dielectric layer 90 that is disposed over or under the corresponding dielectric layer 90. Such a case should be left aside because the dielectric layer will be filtered in a process of manufacturing a ceramic capacitor.

Meanwhile, another example of a common ceramic capacitor may include a ceramic capacitor in which a first internal electrode and a second internal electrode are formed (or disposed) on the same horizontal plane, but one end of the first internal electrode is formed to face one end of the second internal electrode. Sides of such a ceramic capacitor face each other at one place. Capacitance will be generated between the sides at the one place. In contrast, in the ceramic capacitor of the third embodiment of the present disclosure, capacitance is generated between the sides of the four places that face each other. Accordingly, in the ceramic capacitor of the third embodiment of the present disclosure, a greater capacitance value can be formed, and the design (or adjustment) of a capacitance value is also easier by adjusting the lengths of two sides that face each other, an interval between the two sides, etc.

As described above, in the ceramic capacitor of the third embodiment of the present disclosure, there is no change in a capacitance value although a slight deviation occurs because there is a problem with the alignment of the first internal electrode 92 and/or the second internal electrode 94.

Figure 14:
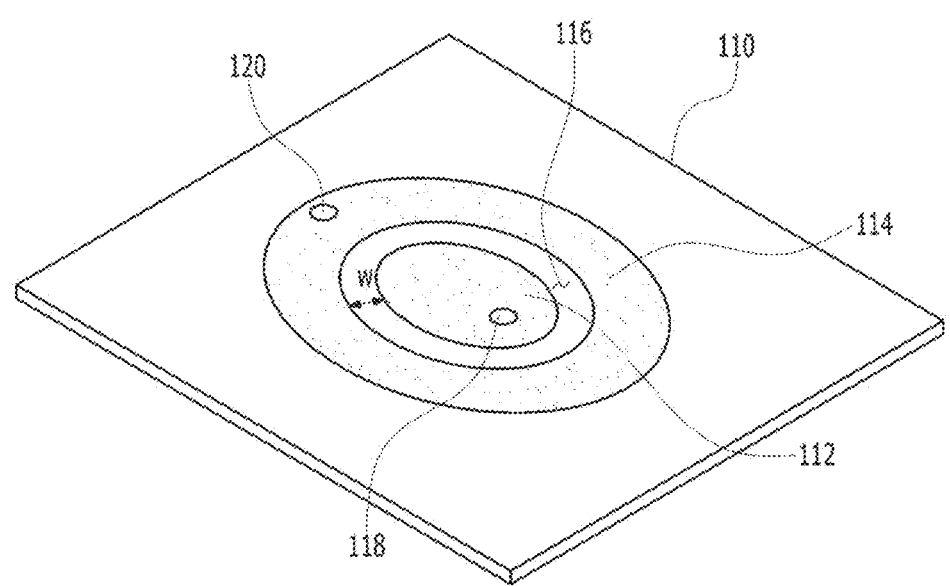
FIG. 14 is a diagram illustrating a modified example of the third embodiment of the present disclosure.

FIG. 14 is a diagram illustrating a modified example of the third embodiment of the present disclosure.

The modified example of FIG. 14 is the same as the third embodiment of the present disclosure except forms of internal electrodes.

That is, according to the modified example of FIG. 14, a first internal electrode 112 of a dielectric layer 110 is formed in an oval shape. A second internal electrode 114 of the dielectric layer 110 is formed to surround the circumference of the first internal electrode 112, but to be spaced apart from the first internal electrode 112 at a designated interval w through the medium of a separation space 116. Furthermore, a first via 118 is formed in the first internal electrode 112, and a second via 120 is formed in the second internal electrode 114.

As described above, in the modified example of FIG. 14, only the forms of the first and second internal electrodes 112 and 114 are different, and effects by the structure of the third embodiment of the present disclosure can be obtained without any change.

The above description is merely a description of the technical spirit of the present disclosure, and those skilled in the art may change and modify the present disclosure in various ways without departing from the essential characteristic of the present disclosure. Accordingly, the embodiments disclosed in the present disclosure should not be construed as limiting the technical spirit of the present disclosure, but should be construed as describing the technical spirit of the present disclosure. The range of the technical spirit of the present disclosure is not restricted by the embodiments. The range of protection of the present disclosure should be construed based on the following claims, and all of technical spirits within an equivalent range of the present disclosure should be construed as being included in the scope of rights of the present disclosure.

The invention claimed is:

1. Ceramic capacitor comprising:
a ceramic body;
a first internal electrode disposed within the ceramic body;
a second internal electrode disposed within the ceramic body, spaced apart from the first internal electrode on a horizontal plane identical with a horizontal plane of the first internal electrode and configured to surround a circumference of the first internal electrode;
a third internal electrode disposed within the ceramic body and disposed on a horizontal plane different from horizontal planes of the first internal electrode and the second internal electrode; and
a via formed in the first internal electrode,
wherein the via is connected to the third internal electrode.

2. The ceramic capacitor of claim 1, wherein the via connects the first internal electrode to an external electrode of a first cross section, among both cross sections of the ceramic body.

3. The ceramic capacitor of claim 1, wherein the second internal electrode has one end connected to an external electrode of a second cross section, among the both cross sections of the ceramic body.

4. The ceramic capacitor of claim 1, further comprising a tab electrode disposed within the ceramic body, spaced apart from the second internal electrode, and disposed on a horizontal plane identical with the horizontal planes of the first internal electrode and the second internal electrode.

5. The ceramic capacitor of claim 4, wherein the tab electrode has one end connected to an external electrode of a first cross section, among both cross sections of the ceramic body.

6. The ceramic capacitor of claim 1, wherein the third internal electrode has one end connected to an external electrode of a first cross section, among both cross sections of the ceramic body.

7. The ceramic capacitor of claim 1, wherein the third internal electrode comprises an extension part and forms a form of an alphabetic letter T.

8. The ceramic capacitor of claim 7, wherein the extension part has a length up to a location over or under a location at which the first internal electrode has been formed.

9. The ceramic capacitor of claim 8, wherein the extension part extends up to a location over or under a location on one side of the first internal electrode after passing a location at which the via has been formed.

10. The ceramic capacitor of claim 7, wherein the extension part has a width that is greater than a diameter of the via and that is smaller than a width of the first internal electrode.

11. The ceramic capacitor of claim 1, further comprising a dummy electrode disposed within the ceramic body, spaced apart from the third internal electrode, and disposed on a horizontal plane identical with the horizontal plane of the third internal electrode.

12. The ceramic capacitor of claim 11, wherein the dummy electrode has one end connected to an external electrode of a second cross section, among both cross sections of the ceramic body.

13. The ceramic capacitor of claim 1, further comprising a tab electrode disposed within the ceramic body, spaced apart from the second internal electrode, and disposed on a horizontal plane identical with the horizontal planes of the first internal electrode and the second internal electrode.

14. The ceramic capacitor of claim 13, wherein the tab electrode has one end connected to an external electrode of the first cross section, among both cross sections of the ceramic body.

15. The ceramic capacitor of claim 1, further comprising:
a second via formed in the second internal electrode.

16. The ceramic capacitor of claim 15, wherein:
the first via connects the first internal electrode to a first bottom electrode on a lower surface of the ceramic body, and
the second via connects the first internal electrode to a second bottom electrode on the lower surface of the ceramic body.

* * * * *